United States Patent
Engelsmann et al.

[15] 3,706,268
[45] Dec. 19, 1972

[54] PHOTOGRAPHIC APPARATUS

[72] Inventors: Dieter Engelsmann, 8025 Unterhaching; Hubert Hackenberg, 8 Munich 21; Karl Deeg, 8025 Unterhaching, all of Germany

[73] Assignee: Agfa-Gevaert Aktiengesellschaft, Leverkusen, Germany

[22] Filed: July 28, 1971

[21] Appl. No.: 166,911

[30] Foreign Application Priority Data

July 30, 1970 Germany ............... P 20 37 966.2

[52] U.S. Cl. .................. 95/53 R, 95/11.5, 95/59
[51] Int. Cl. ................... G03b 9/10, G03b 15/05
[58] Field of Search ........ 95/10 C, 11.5, 53 EB, 53 R, 95/58, 60

[56] References Cited

UNITED STATES PATENTS

| | | | |
|---|---|---|---|
| 2,800,844 | 7/1957 | Durst et al. | 95/60 |
| 3,584,551 | 6/1971 | Dierks | 95/11.5 R X |
| 3,318,217 | 5/1967 | Ernisse | 95/11.5 R |
| 3,139,805 | 7/1964 | Peterson | 95/11.5 R |
| 3,584,554 | 6/1971 | Hochreiter | 95/11.5 R |
| 3,576,156 | 4/1971 | Michatek | 95/11.5 R |
| 3,584,556 | 6/1971 | Harvey | 95/11.5 R |

Primary Examiner—Joseph F. Peters, Jr.
Attorney—Michael S. Striker

[57] ABSTRACT

The shutter of a still camera is normally held in a closed and cocked position by a lever which is biased by a torsion spring to bear against a pivotable impeller. The latter can be cocked by the film transporting mechanism and is normally held in the cocked position by the camera release member. When the release member permits the impeller to move to its uncocked position, the latter strikes against the pin of a piezoelectric device to thereby fire a flash lamp or an electronic flash for artificial illumination of the subject. The lever is provided with an adjustable cam which is located in the path of movement of the impeller to its uncocked position so that the impeller engages the cam and disengages the lever from the shutter. The shutter opens a preselected interval of time ahead of the generation of artificial light, and the length of such interval is determined by the distance between the uncocked position of the impeller and that intermediate position in which the impeller engages the cam to disengage the lever from the shutter.

10 Claims, 1 Drawing Figure

PATENTED DEC 19 1972
3,706,268
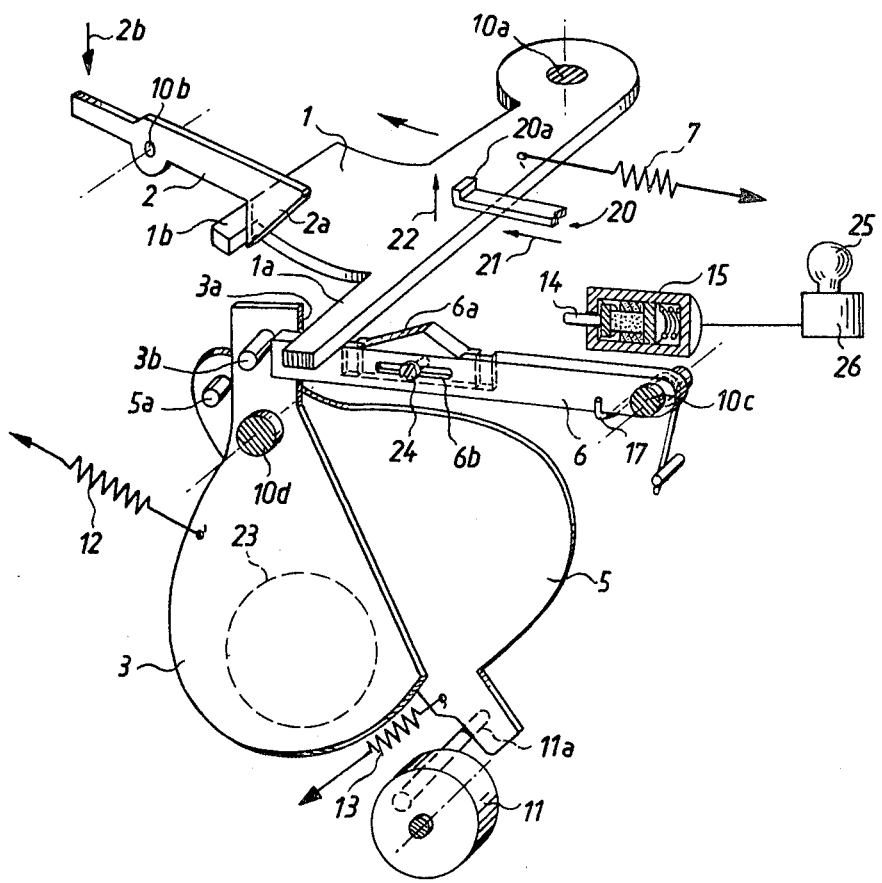
INVENTOR
DIETER ENGELSMANN
HUBERT HACKENBERG
KARL DEEG

PHOTOGRAPHIC APPARATUS

BACKGROUND OF THE INVENTION

The present invention relates to photographic apparatus in general, especially to still cameras, and more particularly to improvements in photographic apparatus of the type wherein a series of operations must be carried out in a predetermined sequence and at accurately determined timely spaced intervals.

It is well known that, when a photographic apparatus is provided or connected with a source of artificial light, the actuation of such light source must be properly synchronized with the actuation of the shutter in order to insure that the light source will produce artificial light for illumination of a subject or scene when the shutter is fully open or when the size of the opening defined by the shutter reaches a predetermined value. Proper synchronization of the operation of shutters with the operation of sources of artificial light normally necessitates the use of precision finished parts and contributes excessively to the cost of photographic apparatus, especially to the cost of popularly priced cameras.

SUMMARY OF THE INVENTION

An object of the invention is to provide in a photographic apparatus novel and improved means for properly synchronizing the movements of various parts or units which must be operated or actuated in a predetermined sequence and at timely spaced intervals.

Another object of the invention is to provide a still camera with novel means for actuating the shutter and a source of artificial light in a predetermined sequence and at predetermined timely spaced intervals.

A further object of the invention is to provide a photographic apparatus with simple, compact, rugged and reliable means for insuring the operation or actuation of two or more parts or units at predetermined intervals.

An additional object of the invention is to provide a photographic apparatus with readily adjustable means for insuring the operation or actuation of two or more parts or units at desired timely spaced intervals.

The invention is embodied in a photographic apparatus which comprises a plurality of units including a first unit (e.g., the shutter or an automatic exposure control) which is actuatable to perform a first function (namely, the admission of scene light in the case of the shutter and automatic adjustment of the diaphragm and/or shutter as a function of scene brightness in the case of the exposure control) and a second unit (e.g., a source of artificial light or the shutter) which is actuatable with a predetermined delay following the actuation of the first unit to perform a second function (namely, the firing of a flash bulb or the like in the case of the light source and the admission of scene light in the case of the shutter), and novel means for actuating the units. The actuating means comprises a timer element (e.g., a one-armed lever) which is movable (and is preferably biased) to an operative position in which it prevents the actuation of the first unit, a displacing element (e.g., a spring-biased impeller) which is movable from a first position to a second position to thereby effect the actuation of the second unit, and cam means provided on one of the two elements (e.g., on the timer element) and arranged to engage with the other element in an intermediate position of the displacing element to thereby effect the movement of the timer element from its operative position with attendant actuation of the first unit. The delay between the actuation of the first unit and the actuation of the second unit depends on the length of the interval of time which elapses during movement of the displacing element from its intermediate position to its second position; such interval can be varied by changing the position of the cam means with reference to the one element.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic perspective view of a portion of a photographic apparatus which embodies the invention.

DESCRIPTION OF THE PREFERRED EMBODIMENTS

The drawing illustrates a portion of a still camera having a customary housing or body which has been omitted for the sake of clarity. The camera further comprises a rapid-transport film advancing or transporting mechanism which includes an output member 20 movable in directions indicated by the arrows 21 and 22. A film transporting mechanism which can be used in the apparatus of the present invention is disclosed, for example, in the commonly owned U.S. Pat. No. 3,489,070 granted Jan. 13, 1970 to Fauth. While it moves in the direction indicated by the arrow 21, the output member 20 pivots a displacing element here shown as an impeller 1 about the axis of a vertical shaft 10a which is mounted in the camera housing. The displacing element or impeller 1 thereby stresses a relatively strong helical return spring 7 and cocks a relatively simple shutter having a leading blade 3 and a trailing blade 5. To this end, the impeller 1 comprises a projection 1a which engages a projection 3a of the leading blade 3 and pivots the latter about the axis of a horizontal shaft 10a in counterclockwise direction, as viewed in the drawing, to thereby stress a helical spring 12. The trailing shutter blade 5 has a projection stud 5a which is engaged by the projection 3a of the leading blade 3 so that the blade 5 is caused to turn about the axis of the shaft 10d in a counterclockwise direction and to stress a helical spring 13 in response to similar pivotal movement of the leading blade 3.

The impeller 1 further comprises a second projection 1b which is engaged by the pallet or tooth 2a of a camera release member 2 pivotable on a horizontal shaft 10b which is mounted in the housing of the camera. The release member 2 normally holds the impeller 1 in the illustrated first end position against the action of the return spring 7. In order to make an exposure, the user of the camera must pivot the release member 2 by applying pressure in the direction indicated by the arrow 2b. The output member 20 of the film transporting mechanism is caused to move in the direction indicated by the arrow 22 when the pallet 2a already engages and holds the projection 1b of the impeller 1 and while the film transporting mechanism continues to advance the film so as to place a fresh film frame into registry with the picture taking lens, not shown. The front portion 20a of the output member 20 is then moved away from the adjacent edge face of the impeller 1 and the latter is free to turn in a counterclockwise direction in response to contraction of the return spring 7 as soon as the release member 2 is pivoted to disengage its pallet 2a from the projection 1b.

The drawing shows the shutter, including the blades 3, 5 and a retarding mechanism 11, in the cocked or closed position. The leading blade 3 overlies a light admitting aperture 23 and the trailing blade 5 is out of register with the aperture 23. The retarding mechanism 11 has a stop 11a which holds the trailing blade 5 against movement in a clockwise direction toward registry with the aperture 23. The details of the delay mechanism 11 form no part of the present invention; it may comprise a conventional escapement which yields gradually to the bias of the spring 13 to permit movement of the trailing blade 5 into registry with the aperture 23 with a predetermined (and preferably adjustable) delay following the movement of the leading blade 3 away from registry with the aperture 23.

In accordance with a feature of the invention, the camera further comprises a timer element or tolerance-compensating element in the form of a one-armed lever 6 which is pivotably about the axis of a horizontal shaft 10c and is biased in a clockwise direction, as viewed in the drawing, by a torsion spring 17 which is weaker than the return spring 7 for the impeller 1. In the illustrated operative position, the timer element 6 abuts against a projection or post 3b of the leading shutter blade 3 to hold the latter in the closing position in which the blade 3 overlaps the aperture 23. The timer element 6 has an upper edge face which is tracked by the projection 1a of the impeller 1 and carries a preferably adjustable cam 6a which can be depressed by the impeller 1 when the latter pivots under the action of the return spring 7 to thereby stress the torsion spring 17 and to cause the timer element 6 to become disengaged from the post 3b on the leading shutter blade 3. A piezoelectric firing device 15 has a pin 14 which is located in the path of movement of the impeller 1 from the illustrated first to a second end position. When the impeller 1 strikes against the pin 14, the firing device 15 produces a high-voltage pulse which is transmitted to and fires a lamp 25 forming part of a source of artificial light and being preferably removably received in a socket 26 mounted in the housing of the camera. The cam 6a is shown as being adjustable lengthwise of the timer element 6 and can be secured in selected position (at a selected distance from the pin 14 of the piezoelectric firing device 15) by a coupling screw 24 or the like. The timer element 6 has an elongated slot 6b through which the screw 24 extends into mesh with a downwardly projecting extension (not shown) of the cam 6a at the rear side of the timer element 6. Thus, the position of the cam 6a can be changed within a desired range to place the rising left-hand face of the cam 6a at a desired distance from the pin 14 and to thus determine in advance the delay with which the piezoelectric firing device 15 is actuated to produce a high-voltage pulse subsequent to movement of the leading shutter blade 3 to its open position under the action of the spring 12. Such movement of the blade 3 to its open position can take place as soon as the projection 1a of the impeller 1 begins to ride on the inclined left-hand face of the cam 6a and reaches a position in which the left-hand end portion of the timer element 6 is disengaged from the post 3b on the blade 3.

In the illustrated first end position, the projection 1b of the displacing element or impeller 1 is held by the pallet 2a of the release member 2 and the projection 1a cooperates with the torsion spring 17 to maintain the timer element 6 in an angular position in which this element extends into the path of movement of the post 3b and maintains the leading shutter blade 3 in the illustrated closed position in which the spring 12 stores energy and the blade 3 overlies the aperture 23 to prevent entry of scene light. The spring 13 also stores energy because the trailing shutter blade 5 is held in the open position and bears against the stop 11a of the retarding mechanism 11. However, the retention of blade 5 in such open position is not effected by the stop 11a but rather by the projection 3a which bears against the projection 5a. The torsion spring 17 biases the timer element 6 against the underside of the projection 1a on the impeller 1.

If the user of the camera wishes to make an exposure, the film transporting mechanism must be operated first in order to move the output member 20 in the direction indicated by the arrow 21 and thereupon in the direction indicated by the arrow 22. Thus, the front portion 20a of the output member 20 of the film transporting mechanism moves the impeller 1 from the second end position (in which the impeller abuts against the pin 14 of the piezoelectric firing device 15) to the illustrated first end position in which the projection 1b is engaged by the pallet 2a. The spring 7 is caused to store energy and the projection 1a cocks the shutter by respectively moving the blades 3, 5 to the closed and open positions. At the same time, the projection 1a causes the timer element 6 to assume the illustrated operative position in which the element 6 prevents the blades 3 and 5 from leaving the illustrated cocked positions. The springs 12 and 13 store energy. As mentioned before, the output member 20 of the film transporting mechanism moves in the direction indicated by the arrow 22 and its front portion 20a thus bypasses the impeller 1 shortly after the projection 1b is engaged by the pallet 2a. The camera is then ready to make an exposure during which the leading blade 3 permits scene light to pass through the aperture 23 and to impinge on an unexposed film frame for a period of time which is determined by the setting of the retarding mechanism 11. If the user wishes to make an exposure, the release member 2 is pivoted in response to the application of pressure in the direction indicated by the arrow 2b so as to disengage the pallet 2a from the projection 1b. Thus, the spring 7 is free to dissipate energy and to propel the impeller 1 toward the second end position because the pallet 2a is disengaged from the projection 1b and the output member 20 of the film transporting mechanism is out of the way.

The actuation of the shutter (i.e., the movement of the leading shutter blade 3 from registry with the light admitting aperture 23) takes place when the projection 1a reaches the inclined left-hand face of the cam 6a and pivots the timer element 6 against the opposition of the spring 17 to such an extent that the left-hand end portion of the timer element 6 moves out of registry with the post 3b of the blade 3. The spring 12 then contracts and pivots the blade 3 to the open position. The trailing blade 5 can leave the illustrated open position to close the shutter with a delay which is determined by the setting of the retarding mechanism 11.

The projection 1a of the impeller 1 pivots beyond the cam 6a on the timer element 6 and strikes the pin 14 of the piezoelectric firing device 15 with a predetermined delay following the actuation of the shutter. Such delay is determined by the selected position of the cam 6a with reference to the shaft 10c, i.e., with reference to the pin 14. The device 15 fires the lamp 25 which illuminates the subject at the proper time, namely, when the aperture 23 is free to admit scene light to an unexposed film frame. The exposure is completed when the stop 11a of the retarding mechanism 11 frees the trailing blade 5 which is then pivoted by the spring 13 to move to the closed position in which it overlies the aperture 23.

Prior to the making of the next exposure, the user of the camera must again actuate the film transporting mechanism so that the output member 20 returns the impeller 1 to the illustrated first end position and the impeller cocks the shutter and cooperates with the spring 17 to hold the timer element 6 in the illustrated operative position. The manner in which the output member 20 is returned to a position in which it can pivot the impeller 1 against the opposition of the spring 7 during forward transport of the film by the length of a frame forms no part of the present invention.

The blades 3, 5 of the shutter constitute a first camera unit which is actuatable to perform a first function (the admission of scene light) in an intermediate position of the impeller 1, namely, in that position in which the impeller 1 causes the cam 6a to pivot the timer element 6 from the illustrated operative position. The firing device 15 constitutes a second camera unit which is actuated to perform a second function (firing of the lamp 25) in response to movement of the impeller 1 to its second end position and with a delay which begins with the actuation of the first unit and is determined by the position of the cam 6a with reference to the timer element 6.

It is clear that the improved photographic apparatus is susceptible of many additional modifications. For example, the piezoelectric firing device 15 can be replaced with a cartridge or with other means for the firing of flash lamps with a predetermined delay following the actuation of shutter for movement of its blade or blades to open positions. Also, the impeller 1 can be caused to strike a second impeller to thereby cause such second impeller to fire a lamp. Still further, the impeller 1 can be used to merely release a further impeller which thereupon transmits an impact or impulse to a piezoelectric or other lamp firing device.

It is further within the purview of the invention to employ the impeller 1 as a means for first releasing an automatic exposure control unit which sets the shutter and/or the diaphragm of a photographic apparatus as a function of prevailing scene brightness and for thereupon opening the shutter with a predetermined (and preferably adjustable) delay following the release of the exposure control unit. The cam 6a is then engaged by the projection 1a to cause the timer element 6 to release the exposure control unit and the shutter is opened when the impeller 1 reaches its second end position with a predetermined delay following the actuation of the exposure control unit. The adjustability of the cam 6a with reference to the timer element 6 renders it possible to employ the illustrated arrangement in different types of photographic apparatus as well as to select at will the delay with which a second actuatable unit (in the illustrated embodiment the firing device 15 for the lamp 25) is actuated following actuation of the first actuatable unit (in the illustrated embodiment the shutter and more particularly the blade 3 of the shutter).

The cam 6a or an analogous cam can be fixedly or adjustably mounted on the impeller 1 to engage and to pivot the timer element 6 from the illustrated operative position in a predetermined intermediate position of the impeller and to thus insure that the shutter is actuated and performs its light-admitting function a predetermined interval of time prior to actuation of the piezoelectric firing device 15 to perform the light-generating function.

Without further analysis, the foregoing will so fully reveal the gist of the present invention that others can, by applying current knowledge, readily adapt it for various applications without omitting features which fairly constitute essential characteristics of the generic or specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera, a combination comprising a plurality of camera units, one of said units constituting the shutter of the photographic apparatus and another of said units comprising a source of artificial light and said camera units including a first unit which is actuatable to perform a first function and a second unit which must be actuated with a predetermined delay following the actuation of said first unit to perform a second function; and means for actuating said first and second units, comprising a timer element movable to an operative position in which it prevents the actuation of said first unit, a displacing element movable from a first position to a second position to thereby effect the actuation of said second unit, and cam means provided on one of said elements and arranged to engage with the other element in an intermediate position of said displacing element to thereby effect the movement of said timer element from said operative position with attendant actuation of said first unit.

2. A combination as defined in claim 1, wherein said disengaging element is an impeller and further comprising biasing means for urging said impeller to said second position so that said impeller actuates said second unit by transmitting thereto an impulse under the action of said biasing means.

3. A combination as defined in claim 1, wherein said cam means is provided on said timer element and further comprising biasing means for urging said timer element to said operative position in which said cam means is located in the path of movement of said displacing element from said first to said second position.

4. A combination as defined in claim 1, wherein said first unit is said shutter and is actuatable to perform a light-admitting function in response to movement of said timer element from said operative position.

5. A combination as defined in claim 1, wherein said source comprises an impulse-responsive firing device and said displacing element is an impeller which is arranged to effect the actuation of said firing device in response to movement to said second position.

6. A combination as defined in claim 1, further comprising film transporting means operable to transport the film and having output means for moving said displacing element from said second to said first position in response to operation of said film transporting means.

7. A combination as defined in claim 1, wherein one of said first and second units is said shutter and is movable between cocked and uncocked positions and further comprising means for moving said displacing element from said second to said first position, said displacing element having means for moving said shutter to said cocked position in response to movement of said displacing element from said second to said first position.

8. A combination as defined in claim 1, further comprising first biasing means for urging said displacing element to said second position with a first force and second biasing means for urging said timer element to said operative position with a second force which is weaker than said first force so that said displacing element can move said timer element from said operative position against the opposition of said second biasing means when said displacing element moves from said first to said second position thereof under the action of said first biasing means.

9. A combination as defined in claim 1, further comprising biasing means for urging said displacing element from said first to said second position and release means for normally holding said displacing element in said first position, said release means being operable to free said displacing element to the action of said biasing means.

10. A combination as defined in claim 1, wherein said cam means is adjustable with reference to said one element to select said intermediate position of said displacing element and further comprising coupling means for securing said cam means to said one element in one of a plurality of selected positions.

* * * * *